Patented May 18, 1943

2,319,545

UNITED STATES PATENT OFFICE 2,319,545

RESOLUTION OF RACEMIC α-HYDROXY-β,β-DIMETHYL-γ-BUTYRO LACTONE, AND NEW COMPOUNDS OBTAINED BY SUCH RESOLUTION

Stanton A. Harris, Westfield, and Karl Folkers, Plainfield, N. J., assignors to Merck & Co., Inc., Rahway, N. J. a corporation of New Jersey No Drawing. Application July 3, 1940,
Serial No. 343,778

12 Claims. (Cl. 260—284)

This invention relates to the resolution of racemic α-hydroxy-β,β-dimethyl-γ-butyrolactone, and to new compounds obtained in such resolution.

We have discovered that racemic α-hydroxy-β,β-dimethyl-γ-butyrolactone can be resolved into its optical isomers, by converting the racemic lactone into the alkaloidal salts of the (+) and (−) α, γ-dihydroxy-β,β-dimethyl butyric acids, following which the alkaloidal salts are separated by fractional crystallization, and then are converted into the optical isomers (+) and (−) α-hydroxy-β,β-dimethyl-γ-butyro lactone.

The symbols "(+)" and "(−)" are used to designate the optical isomers. They refer to the direction of rotation. These symbols are used in preference to the designation "dextro" (or "d") and "laevo" (or "l") because the latter are used to denote the absolute optical configuration of the compounds involved. The optical configuration in the case of these lactones and acids is unknown at present. The (+) lactone gives rise to the (−) acid and vice versa.

We have discovered also that in solutions containing equivalent quantities of an alkaloidal salt and a metal salt of racemic α, γ-dihydroxy-β,β-dimethyl-butyric acid, crystallization occurs in such a manner that the alkaloidal salt of one optical isomer is obtained substantially free from salts of the other optical isomer.

We have discovered further that a partially resolved mixture of α-hydroxy-β,β-dimethyl-γ-butyrolactone can be separated by crystallization from a benzenoid hydrocarbon or ether solvent into its pure optical isomer and the racemic lactone, the latter of which stays in the solvent. This applies to both the (+) and (−) isomers.

The (−) lactone is a starting material in the production of pantothenic acid, a growth promoting substance. The lactone is reacted with β-alanine or its esters to form the pantothenic acid.

Example I

A solution of 65 g. (.5 mol) of racemic α-hydroxy-β,β-dimethyl-γ-butyrolactone in 200 cc. of water is heated with a 20% excess of barium hydroxide on a steam bath for two hours. On cooling, crystallization of the barium salt takes place, so the temperature of the solution is maintained at 80–90° C. and the excess of barium hydroxide is neutralized with carbon dioxide. The barium carbonate is filtered off, and the total volume of the filtrate is brought to 500 cc.

A portion of the above solution (182.5 cc.) containing 0.1825 equivalent of the barium salt of α-γ-dihydroxy-β,β-dimethylbutyric acid is added to a paste of 71.4 g. (0.1825 equivalents) of quinine sulfate, and the solution brought to boiling. The total volume is about 750 cc. This hot solution is quickly centrifuged and decanted when a crystalline quinine salt is obtained. The barium sulfate is extracted with boiling water to remove an additional quantity of the crystallized quinine salt which is obtained by concentrating to a small volume, and allowing to crystallize. Heavy dense prisms, which cling to the side of the flask, are obtained. These crystals are recrystallized from 95% alcohol; M. P. 186–188° C. $(\alpha)^{25}_D = -130°$ C. Decomposition of these crystals with hot alkali, and extraction of the quinine with chloroform, gives a dextro rotatory sodium salt, which, upon treatment with HCl, gives (−) α-hydroxy-β,β-dimethyl-γ-butyrolactone.

The original mother liquor is concentrated to a small volume, and the crystalline precipitate is recrystallized from 95% alcohol. The crystals are in the form of fine needles which form feather-like clusters that soon fill the total volume of the alcohol; M. P. 176–178° C. $(\alpha)^{25}_D = -146°$. Three grams of this quinine salt is decomposed with hydrochloric acid, and extracted with ether. After recrystallization from benzene the (+) lactone has a melting point of 88–89° C., and $(\alpha)^{25}_D = +50.7°$ in water. The yield of crude material is 67%.

Example II

A solution of 21.0 g. (0.1615 mole) of redistilled α-hydroxy-β,β-dimethyl-γ-butyrolactone in 48.5 cc. of water is heated on a steam bath with 46.0 cc. of 3.872 N sodium hydroxide (0.178 mole) until the temperature reaches 85–90°. The solution is cooled and the excess sodium hydroxide is carefully neutralized with 2.5 N hydrochloric acid until the pH of the solution reaches 7. The solution is diluted to 400 cc., heated to 80° C. when 32.0 g. (0.0807 mole) of solid quinine hydrochloride is added slowly. Before all the quinine hydrochloride is added, the crystalline quinine salt of the dextro rotatory acid starts separating. The solution is allowed to cool overnight in the refrigerator and then filtered from the crystals which are well washed with cold water. The salt is dried to constant weight at 60° C. Yield 32.4 g. Concentration of the mother liquors yield an additional 1.4 g. The total yield is 33.8 g. or 88.5% of the theoretical amount of the desired isomer namely the quinine salt of the dextro rotatory α, γ-dihydroxy-β,β-dimethyl butyric acid; M. P. 187.5° C.; $(\alpha)^{24}_D = -130.6°$ in methanol, C.=1%.

Twenty and one-tenths grams (0.0425 mol) of the quinine salt (M. P.=187.5° $(\alpha)^{25}_D=-130°$) is dissolved in 50 cc. of 2.5 N hydrochloric acid (three equivalents), heated on a steam bath for twenty minutes, and then continuously extracted with ethyl ether for eleven hours. The ether solution is evaporated to dryness, taken up in absolute alcohol and benzene, and again evaporated to dryness in order to remove the water. The crystalline residue has a low rotation which is raised to the maximum by recrystallization from hot benzene. The yield of (−) α-hydroxy-β,β-dimethyl-γ-butyrolactone is 3.95 gm. (.0304 mol) or 71.5% of the theory; M. P. 89–90° C., $(\alpha)^{25}_D=-50.70$. The mixed M. P. with the lactone isolated from natural panothenic acid shows them to be identical. Further ether extraction of the aqueous solutions, and working up of the mother liquors will increase the yields.

Alternatively the lactone is recovered as follows: 44.9 g. of the quinine salt of the (−) lactone $[(\alpha)^{25}_D=130°$ approximately] (0.0951 mole) are heated with 110 cc. of water until boiling but it only partially dissolves. 24.55 cc. of 3.87 N NaOH (.0951 mole) are warmed and added. The voluminous white solid which forms (quinine) is extracted by shaking with chloroform until the solution is neutral which takes about one-half hour. The water solution is evaporated to complete dryness, using benzene and alcohol to remove the water. Thus, the sodium salt of (+) α, γ-dihydroxy-β,β-dimethylbutyric acid is obtained in the dry state. The dry sodium salt or its concentrated aqueous solution can be converted to the (−) lactone by heating on steam bath with a slight excess of acid and then extracting with ether as described in the previous paragraph.

The aqueous mother liquors from which the quinine salt of the (+) dihydroxy acid is removed is treated with a slight excess of sodium hydroxide to precipitate the quinine which is completely extracted with chloroform. The pH is brought to neutrality with hydrochloric acid and the solution concentrated until sodium chloride separates. The filtrate is acidified with hydrochloric acid and again concentrated until salt separates. Alcohol and benzene are added and the concentration repeated until all of the water is removed. After the removal of all of the sodium chloride, the residue is dissolved in benzene, filtered and evaporated to a small volume. On standing in the refrigerator a crystalline mass is obtained; M. P. 87–88 $(\alpha)^{25}_D=+47.9°$ in water. A second crop has a M. P. of 77–78° $(\alpha)^{25}_D=+43.8°$. Recrystallization of the material from benzene yields pure +α-hydroxy-β,β-dimethyl-γ-butyrolactone $(\alpha)^{25}_D=+51.36°$; M. P. 91–91.5°. Additional crops are obtained from the mother liquors by repeated fractional crystallization from benzene plus petroleum ether (B. P. 30–40° C.). Finally the material is separated into pure (+) lactone and crude racemic lactone which is left in the mother liquor. This is obtained as a waxy hygroscopic solid by adding petroleum ether to the benzene mother liquor $(\alpha)^{26}_D=+13.9°$. The rotation shows that a large percentage of the (+) lactone is already removed.

*Example III*

To a solution of 9.7 gm. (0.0746 mol) of racemic α-hydroxy-β,β-dimethyl-γ-butyrolacetone in water is added a solution of 4.65 gm. (10% excess) of barium hydroxide in hot water, and heated for two hours on a steam bath. The excess barium hydroxide is neutralized with carbon dioxide, and the barium carbonate removed by filtration. The solution is cooled to 0° C. in ice water, and carefully neutralized with N sulfuric acid. 97% of the theoretical amount of acid is used. The pH of the solution is about 2, showing that the dihydoxy acid is a strong acid. The solution is centrifuged from the bulk of the barium sulfate, and divided into six equal parts. Each of these parts is added respectively to one molecular equivalent of quinine, quinidine, cinchonidine, cinchonine, strychnine, and brucine alkaloids, which are made to a paste with water. The mixtures are heated to boiling, and filtered or centrifuged from insoluble material. The quinine salt crystallizes from the hot water as described in Example I. The cinchonidine salt also crystallizes from the water solution; M. P. 167–168° $(\alpha)^{25}_D=-91.75°$. This salt is readily recrystallized from hot water, alcohol or acetone. Brucine forms a salt in hot water. Quinidine, cinchonine and strychnine form salts that are soluble in cold water. The water is evaporated and the residue is taken up in acetone. After standing for three weeks the quinidine salt of the dihydroxy acid, as proved by analysis, starts to crystallize and is purified by recrystallization from acetone; M. P. 178.5° C. $(\alpha)^{26}_D=+176.7$ in methanol. The cinchonine salt also forms crystals.

The foregoing examples are given by way of illustration and not of limitation, and modifications may be made in carrying out the present invention, without departing from the spirit and scope thereof.

We claim:

1. The process comprising separating the alkaloidal salts of the optical isomers of α, γ-dihydroxy-β,β-dimethyl-butyric acid from each other by fractional crystallization.

2. The process comprising separating the quinine salts of the optical isomers of α, γ-dihydroxy-β,β-dimethyl-butyric acid from each other by fractional crystallization.

3. The process comprising separating the cinchonidine salts of the optical isomers of α, γ-dihydroxy-β,β-dimethyl-butyric acid from each other by fractional crystallization.

4. The process comprising separating the quinidine salts of the optical isomers of α, γ-dihydroxy-β,β-dimethyl-butyric acid from each other by fractional crystallization.

5. The process comprising treating racemic-α-hydroxy-β,β-dimethyl-γ-butyro lactone with barium hydroxide to form the barium salts of α, γ-dihydroxy-β,β-dimethyl-butyric acid, treating the said barium salts with an alkaloidal sulfate to form alkaloidal salts of α, γ-dihydroxy-β,β-dimethyl-butyric acid, separating the alkaloidal salts by fractional crystallization, and converting the said alkaloidal salts into the optical isomers of α-hydroxy-β,β-dimethyl-γ-butyro lactone.

6. The process comprising treating racemic α-hydroxy-β,β-dimethyl-γ-butyrolactone with sodium hydroxide to form the sodium salts of α, γ-dihydroxy-β,β-dimethylbutyric acid, treating the said sodium salts with one-half equivalent of quinine hydrochloride to form the insoluble crystalline quinine salt of (+) α, γ-dihydroxy-β,β-dimethylbutyric acid and leaving the sodium salt of (−) α, γ-dihydroxy-β,β-dimethyl-butyric acid in solution and converting the said quinine salt into (−) α - hydroxy- β,β- dimethyl -γ- butyrolactone and the said sodium salt into (+) α-hydroxy-β,β-dimethyl-γ-butyrolactone.

7. A compound of the class consisting of alkaloidal salts of acids of the group consisting of resolved (+) and (−) α,γ-dihydroxy-β,β-dimethyl butyric acids, said compound being in a form substantially free from the optical isomer.

8. A compound of the class consisting of cinchona alkaloidal salts of acids of the group consisting of resolved (+) and (−) α,γ-dihydroxy-β,β-dimethyl butyric acids, said compound being in a form substantially free from the optical isomer.

9. A compound of the class consisting of quinine salts of acids of the group consisting of resolved (+) and (−) α,γ-dihydroxy-β,β-dimethyl butyric acids, said compound being in a form substantially free from the optical isomer.

10. A compound of the class consisting of cinchonidine salts of acids of the group consisting of resolved (+) and (−) α,γ-dihydroxy-β,β-dimethyl butyric acids, said compound being in a form substantially free from the optical isomer.

11. A compound of the class consisting of quinidine salts of acids of the group consisting of resolved (+) and (−) α,γ-dihydroxy-β,β-dimethyl butyric acids, said compound being in a form substantially free from the optical isomer.

12. The process comprising separating the cinchona alkaloidal salts of the optical isomers of α,γ-dihydroxy-β,β-dimethyl-butyric acid from each other by fractional crystallization.

STANTON A. HARRIS.
KARL FOLKERS.